(12) United States Patent
Cao et al.

(10) Patent No.: US 12,499,299 B2
(45) Date of Patent: Dec. 16, 2025

(54) STATISTICAL TIMING ANALYSIS METHOD OF INTEGRATED CIRCUIT UNDER ADVANCED PROCESS AND LOW VOLTAGE

(71) Applicant: SOUTHEAST UNIVERSITY, Nanjing (CN)

(72) Inventors: Peng Cao, Nanjing (CN); Tai Yang, Nanjing (CN); Jingjing Guo, Nanjing (CN)

(73) Assignee: SOUTHEAST UNIVERSITY, Nanjing (CN)

( * ) Notice: Subject to any disclaimer, the term of this patent is extended or adjusted under 35 U.S.C. 154(b) by 867 days.

(21) Appl. No.: 16/969,474

(22) PCT Filed: Feb. 24, 2020

(86) PCT No.: PCT/CN2020/076447
§ 371 (c)(1),
(2) Date: Feb. 3, 2023

(87) PCT Pub. No.: WO2021/008136
PCT Pub. Date: Jan. 21, 2021

(65) Prior Publication Data
US 2023/0153502 A1    May 18, 2023

(30) Foreign Application Priority Data
Jul. 17, 2019   (CN) .......................... 201910643441.6

(51) Int. Cl.
*G06F 30/30*    (2020.01)
*G06F 30/3312*  (2020.01)
*G06F 30/3315*  (2020.01)
*G06F 119/12*   (2020.01)

(52) U.S. Cl.
CPC ...... *G06F 30/3315* (2020.01); *G06F 30/3312* (2020.01); *G06F 2119/12* (2020.01)

(58) Field of Classification Search
None
See application file for complete search history.

(56) References Cited

U.S. PATENT DOCUMENTS

| | | | |
|---|---|---|---|
| 10,073,934 B1 * | 9/2018 | Keller | G06F 30/3312 |
| 10,185,795 B1 * | 1/2019 | Keller | G06F 30/3312 |
| 10,275,554 B1 * | 4/2019 | Chetin | G06F 30/3315 |
| 10,789,406 B1 * | 9/2020 | Raja | G06F 30/3323 |
| 2002/0016950 A1 * | 2/2002 | Sakamoto | G06F 30/367 |
| | | | 716/113 |

FOREIGN PATENT DOCUMENTS

CN    106066919 B  *  5/2019  .........  G06F 30/3312

* cited by examiner

Primary Examiner — Leigh M Garbowski
(74) Attorney, Agent, or Firm — CBM PATENT CONSULTING, LLC

(57) ABSTRACT

It discloses a statistical timing analysis method of an integrated circuit under an advanced process and a low voltage. By simulating the fluctuation of process parameters of the integrated circuit under the advanced process, a statistical circuit timing model is built based on the relationship between the delay of the integrated circuit under the low voltage and the process parameters, and the maximum delay and the minimum delay under timing fluctuation of the integrated circuit are analyzed.

6 Claims, 5 Drawing Sheets

STATISTICAL TIMING ANALYSIS METHOD OF INTEGRATED CIRCUIT UNDER ADVANCED PROCESS AND LOW VOLTAGE

TECHNICAL FIELD

The present invention relates to timing analysis of an integrated circuit manufactured by an advanced process under a low voltage, and more particularly, to a statistical timing analysis method of an integrated circuit under an advanced process and a low voltage.

BACKGROUND ART

With the continuous increase of the scale and computing power of integrated circuits, energy consumption has become an important limitation to the development of various computing systems, including Internet of Things, embedded equipment, mobile terminals, supercomputers, and data centers. The development of high-energy-efficiency integrated circuit technology is an important means to solve the energy consumption problem of the computing systems. Traditional integrated circuits meet the requirements of reducing the energy consumption density of chips by pursuing the advanced process and equal scaling of power supply voltages. However, with the development of the Moore's law and the Dennard Scaling law to the limit, the process benefits of great reduction of power consumption are gradually disappearing. The traditional development route cannot be maintained. In the past, almost each generation of new manufacturing process meant equal scaling of the power supply voltage, so it could bring step development of intrinsic energy efficiency (ICE) to adapt to the increase of chip computing power and scale. However, after the 130 nm process, it has been difficult for the evolution of the process to ensure great reduction of a working voltage, and its sub-linear increase trend makes the energy efficiency of the computing system unable to keep up with the increase of scale. At the same time, the optimization space of common low-power-consumption technology such as dynamic voltage frequency scaling (DVFS), power gating, multi-threshold devices, and clock gating also becomes relatively limited with approaching of the working voltage and threshold voltage. Therefore, how to further reduce the amplitude of the working voltage and realize step improvement of the energy efficiency has become one of urgent problems to be solved in the computing systems.

According to the near-threshold integrated circuit design, by lowering the power supply voltage of the chip or the circuit to be close to the threshold voltage level of a transistor, great reduction of the energy efficiency can be achieved, and it is considered to be a design technology for improving the computing energy efficiency by an order of magnitude in the future. Compared with the traditional high-energy-efficiency technology which focuses on specific power consumption components or adopts an application-oriented optimization idea, the principle of power consumption reduction by the near-threshold design is based on the power consumption-voltage square rule ($P=CV^2F$), and the energy efficiency of the integrated circuit can be more remarkably improved in an aspect of the circuit working principle.

However, with the rise of the advanced process and the low-voltage technology represented by near-threshold design as well as the remarkable advantages in aspects of integrated circuit performance and energy efficiency, the influence of integrated circuit process parameter fluctuation on circuit timing becomes more and more prominent and nonnegligible, and severe challenges are posed to the integrated circuit design technology. In the integrated circuit manufacturing process, process parameters such as the size of a transistor, the thickness of a gate oxide layer and the doping concentration inevitably deviate from their nominal values due to equipment precision or process limitation, so that physical characteristics of the integrated circuit such as the circuit timing (i.e. circuit delay) accordingly fluctuate. On one hand, under the advanced process, along with the continuous reduction of the line width of the integrated circuit manufacturing process, the circuit timing is more sensitive to the process parameter fluctuation, and the process parameter fluctuation causes the obvious increase of circuit timing fluctuation. On the other hand, under the low voltage, the current characteristics and even the timing characteristics of the integrated circuit have an exponential relationship with the process parameters, so that the circuit timing fluctuation intensification is further caused, and non-Gaussian distribution is shown.

In order to analyze the circuit timing under the influence of the process parameter fluctuation in the advanced process and low voltage design, based on the circuit timing nominal value, the traditional static timing analysis method of the integrated circuits evaluates the statistical distribution range of the circuit timing by multiplying by a specific scaling coefficient. Obviously, the scaling coefficient varies with the cell type, size, load and process corner in the circuit, and improper setting either leads to timing violations under the condition of the timing delay fluctuation of the integrated circuit, i.e., failure to meet expected design functions and performance requirements, or leads to excessive timing margins, resulting in energy efficiency reduction for accommodating circuit extreme conditions.

SUMMARY OF THE INVENTION

Objective of the invention: The objective of the present invention is to provide a statistical timing analysis method of an integrated circuit under an advanced process and a low voltage to more accurately analyze circuit delay distribution under process parameter fluctuation.

Technical solution: In order to achieve the objective, the present invention adopts the following technical scheme:

According to the statistical timing analysis method of the integrated circuit under the advanced process and the low voltage, the advanced process refers to a process below 40 nm, and the low voltage refers to a working voltage of the integrated circuit below a transistor threshold voltage of 0.35 V. A circuit path of the integrated circuit includes at least two stages of circuit cells. The method includes the following steps:

S1: solving a coefficient of each stage of circuit cell according to a linear relationship among a nominal delay of each stage of circuit cell in the circuit path under a non-step input signal, a nominal delay of the current stage of circuit cell under a step input signal, and a nominal delay of the previous stage of circuit cell under the step input signal, and then, obtaining a circuit path delay random variable according to the coefficient of each stage of circuit cell;

S2: performing Monte Carlo simulation on each stage of circuit cell in the circuit path under the step input signal, and performing calculation on a statistical sample set obtained through simulation to obtain a mean value, a variance and a skewness of statistical delay;

S3: calculating a mean value, a variance and a skewness of statistical path delay under the step input signal according to the mean value, the variance and the skewness of the statistical delay of each stage of circuit cell in the circuit path under the step input signal obtained in step S2;

S4: fitting circuit path delay distribution parameters according to the mean value, the variance and the skewness of the statistical path delay under the step input signal obtained in step S3; and S5: calculating a probability density function, a maximum value and a minimum value of the statistical path delay under the step input signal.

Further, step S1 specifically includes the following sub-steps:

S11: solving the coefficient of each stage of circuit cell according to the linear relationship shown in Formula (1):

$$t_{di} = t_{di}^{step} + \eta_{(i-1)} \cdot t_{d(i-1)}^{step} \quad (1),$$

wherein in Formula (1), $t_{di}$ represents a nominal delay of an $i^{th}$ circuit cell in the circuit path under the non-step input signal, $t_{di}^{step}$ represents a nominal delay of the $i^{th}$ circuit cell in the circuit path under the step input signal, $t_{d(i-1)}^{step}$ represents a nominal delay of an $(i-1)^{th}$ circuit cell in the circuit path under the step input signal, $\eta_{(i-1)}$ represents a coefficient of the $(i-1)^{th}$ circuit cell, $2 \leq i \leq n$, and n represents a total number of the circuit cells in the circuit path; and S12: substituting $\eta_{(i-1)}$ into Formula (2) to solve the circuit path delay random variable t_path:

$$\text{t\_path} = \sum_{r=1}^{n} t_{dr} = t_{dn}^{step} + \sum_{j=1}^{n-1}(1+\eta_j)t_{dj}^{step}, \quad (2)$$

wherein in Formula (2), a random variable $t_{dr}$ represents an $r^{th}$ circuit cell delay in the circuit path when the input of the circuit path is a step signal, a random variable $t_{dn}^{step}$ represents an $n^{th}$ circuit cell delay when the input of the cell is a step signal, $\eta_j$ represents a coefficient of a $j^{th}$ circuit cell, and a random variable $t_{dj}^{step}$ represents a $j^{th}$ circuit cell delay when the input of the cell is a step signal.

Further, in step S2, m times of Monte Carlo simulation are respectively performed on each stage of circuit cell in the circuit path when the input of each cell is a step signal, and the statistical sample set obtained through simulation is calculated through Formula (3) to obtain the mean value, the variance and the skewness of the statistical delay of each stage of circuit cell under the step input signal:

$$E(x_r) = \frac{\sum_{k=1}^{m} X_{r,k}}{m}$$

$$D(x_r) = \frac{\sum_{k=1}^{m}(X_{r,k}-\overline{x_r})^2}{m-1}$$

$$S(x_r) = E\left[\left(\frac{x_r - \overline{x_r}}{\sqrt{D(x_r)}}\right)^3\right] = \frac{E(x_r^3) - 3E(x_r)D(x_r) - [E(x_r)]^3}{[\sqrt{D(x_r)}]^3}. \quad (3)$$

In Formula (3), $E(x_r)$ represents a mean value of an $r^{th}$ statistical circuit cell delay under the step input signal, $D(x_r)$ represents a variance of the $r^{th}$ statistical circuit cell delay under the step input signal, $S(x_r)$ represents a skewness of the $r^{th}$ statistical circuit cell delay under the step input signal, $1 \leq r \leq n$, n represents a total number of the circuit cells in the circuit path, a random variable $x_r$ represents an $r^{th}$ circuit cell delay under the step input, $x_{r,k}$ represents a $k^{th}$ delay sample datum of an $r^{th}$ circuit cell under the step input, $E(x_r^3)$ represents a three-order origin moment of the random variable $x_r$, and $\overline{x}_r = E(x_r)$.

Further, in step S3, the mean value, the variance and the skewness of the statistical path delay when the input of the circuit path is the step signal are obtained through calculation via Formula (4):

$$\begin{cases} E(y) = E\left(\sum_{r=1}^{n} a_r x_r\right) = \sum_{r=1}^{n} a_r E(x_r) \\ D(y) = D\left(\sum_{r=1}^{n} a_r x_r\right) = \sum_{r=1}^{n} a_r^2 D(x_r) \\ S(y) = S\left(\sum_{r=1}^{n} a_r x_r\right) = \frac{E\left(\left(\sum_{r=1}^{n} a_r x_r + \mu\right)^3\right)}{\left(D\left(\sum_{r=1}^{n} a_r x_r\right)\right)^{\frac{3}{2}}} \end{cases} \quad (4)$$

In Formula (4), $y = $ t_path represents a circuit path delay random variable under the step input signal, $E(y)$ represents a mean value of y, $D(y)$ represents a variance of y, $S(y)$ represents a skewness of y, $x_r = t_{dr}^{step}$ represents a random variable of an $r^{th}$ circuit cell delay under the step input signal, $E(x_r)$ represents a mean value of $x_r$, $D(x_r)$ represents a variance of $x_r$, $$E\left(\sum_{r=1}^{n} a_r x_r\right)$$

represents a mean value of $$\sum_{r=1}^{n} a_r x_r, \quad E\left(\left(\sum_{r=1}^{n} a_r x_r + \mu\right)^3\right)$$

represents a mean value of $$\left(\sum_{r=1}^{n} a_r x_r + \mu\right)^3, \quad D\left(\sum_{r=1}^{n} a_r x_r\right)$$

represents a variance of $$\sum_{r=1}^{n} a_r x_r, \; 1 \leq r \leq n, \; a_j = 1 + \eta_j,$$

$\eta_j$ represents a coefficient of a $j^{th}$ circuit cell, $1 \leq j \leq n-1$, n represents a total number of the circuit cells in the circuit path, $a_n = 1$, and $\mu = -E(y)$.

In Formula (4), a third skewness expression is further expanded to be written into Formula (5):

$$S(y) = \frac{\sum\limits_{\substack{n+1 \\ \sum\limits_{s=1} t_s = 3, t_s \geq 0}} \frac{3! \prod\limits_{s=1}^{n} (a_s^{t_s} E((x_s)^{t_s})) \mu^{t_{n+1}}}{\prod\limits_{s=1}^{n+1} (t_s!)}}{(D(y))^{\frac{3}{2}}}. \quad (5)$$

$t_s$ is an integer restrained by an expression $$\sum_{s=1}^{n+1} t_s = 3, \, t_s \geq 0,$$

and $1 \leq s \leq n+1$. For $1 \leq s \leq n-1$, $a_s = 1 + \eta_s$, and $\eta_s$ represents a coefficient of a $s^{th}$ circuit cell. For $s = n$, $a_s = 1$. $x_s$ represents a random variable of a $s^{th}$ circuit cell delay under the step input signal.

Further, distribution parameters in step S4 include a position parameter $\varepsilon$, a scaling parameter $\omega$ and a first shape parameter $\lambda$, and are obtained through calculation via Formula (6):

$$E(y) = \alpha_1 \quad (6)$$

$$D(y) = E(y^2) - (E(y))^2, \, E(y^2) = \alpha_2$$

$$S(y) = \frac{E(y^3) - 3E(y)D(y) - (E(y))^3}{(D(y))^{\frac{3}{2}}}, \, E(y^3) = \alpha_3.$$

In Formula (6), the random variable y represents a circuit path delay under the step input, $\alpha_p$ represents a p-order origin moment of the random variable y, $$1 \leq p \leq 3, \, \alpha_p = 2e^{\varepsilon p} e^{\frac{\omega^2 p^2}{2}} \Psi(p\beta\omega),$$

$$\Phi(p\beta\omega) = \frac{1}{\sqrt{2\pi}} \int_{-\infty}^{p\beta\omega} e^{-\frac{(p\beta\omega)^2}{2}} d(p\beta\omega),$$

$\beta$ represents a second shape parameter, $$\beta = \frac{\lambda}{\sqrt{1+\lambda^2}},$$

E(y) represents the mean value of the statistical path delay under the step input signal, D(y) represents the variance of the statistical path delay under the step input signal, S(y) represents the skewness of the statistical path delay under the step input signal, $E(y^2)$ represents a two-order origin moment of the random variable y, and $E(y^3)$ represents a three-order origin moment of the random variable y.

Further, in step S5, the probability density function of the statistical path delay is obtained through calculation via Formula (7):

$$f_{LSN}(y) = \frac{2}{\omega y} \phi\left(\frac{\ln(y)-\varepsilon}{\omega}\right) \Phi\left(\lambda \frac{\ln(y)-\varepsilon}{\omega}\right). \quad (7)$$

In Formula (7), $f_{LSN}(y)$ represents the probability density function of the statistical path delay, $$\phi\left(\frac{\ln(y)-\varepsilon}{\omega}\right) = \frac{1}{\sqrt{2\pi}} e^{-\frac{\left(\frac{\ln(y)-\varepsilon}{\omega}\right)^2}{2}}, \text{ and}$$

$$\Phi\left(\lambda \frac{\ln(y)-\varepsilon}{\omega}\right) = \frac{1}{\sqrt{2\pi}} \int_{-\infty}^{\lambda \frac{\ln(y)-\varepsilon}{\omega}} e^{-\frac{\left(\lambda \frac{\ln(y)-\varepsilon}{\omega}\right)^2}{2}} d\left(\lambda \frac{\ln(y)-\varepsilon}{\omega}\right).$$

The maximum value and the minimum value of the statistical path delay are obtained through calculation via Formula (8):

$$F_{LSN}(y) = \Phi\left(\frac{\ln(y)-\varepsilon}{\omega}\right) - 2T\left(\frac{\ln(y)-\varepsilon}{\omega}, \lambda\right) = \Phi(\pm 3). \quad (8)$$

In Formula (8), $$\Phi\left(\frac{\ln(y)-\varepsilon}{\omega}\right) = \frac{1}{\sqrt{2\pi}} \int_{-\infty}^{\frac{\ln(y)-\varepsilon}{\omega}} e^{-\frac{\left(\frac{\ln(y)-\varepsilon}{\omega}\right)^2}{2}} d\left(\frac{\ln(y)-\varepsilon}{\omega}\right).$$

$F_{LSN}(y) = \Phi(3)$ is set, and a corresponding solution y is the maximum value of the statistical path delay. $F_{LSN}(y) = \Phi(-3)$ is set, and a corresponding solution y is the minimum value of the statistical path delay. $F_{LSN}(y)$ represents a cumulative distribution function of the statistical path delay, and $$T\left(\frac{\ln(y)-\varepsilon}{\omega}, \lambda\right)$$

is obtained through calculation via Formula (9):

$$T(H,A) = \frac{1}{2\pi} \int_0^A \frac{e^{-\frac{H^2(1+z^2)}{2}}}{1+z^2} dz. \quad (9)$$

In Formula (9), $$H = \frac{\ln(y)-\varepsilon}{\omega},$$

and $A = \lambda$.

Beneficial effects: The present invention discloses the statistical timing analysis method of the integrated circuit under the advanced process and the low voltage. By simulating the fluctuation of process parameter of the integrated circuit under the advanced process, a statistical circuit timing model is built based on the relationship between the delay of the integrated circuit under the low voltage and the process parameters, and the maximum time delay and the minimum time delay under timing fluctuation of the integrated circuit are analyzed. Compared with a traditional static timing analysis method, the method of the present invention can more accurately analyze circuit delay distribution under process parameter fluctuation, and has great significance on integrated circuit design under the advanced process and the low voltage.

DETAILED DESCRIPTION OF THE INVENTION

The technical schemes of the present invention will be further described in conjunction with specific implementations.

Figure 2:
FIG. 2 is a schematic diagram of a buffer chain in a specific implementation of the present invention.
Figure 3A:
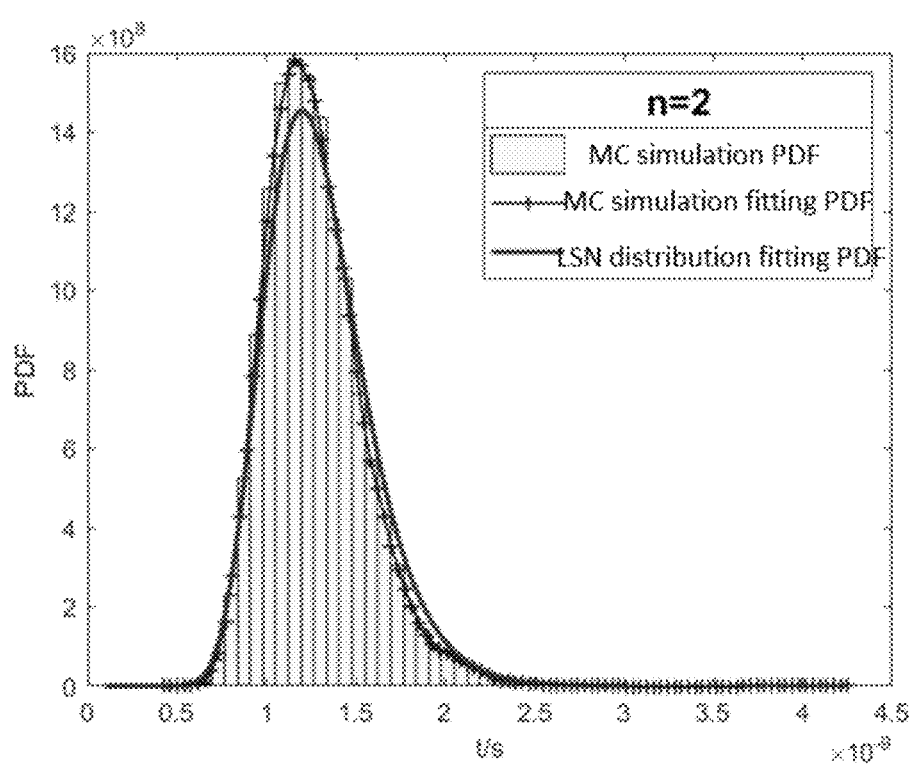
FIG. 3A is a path delay probability density function curve when n=2.
Figure 3B:
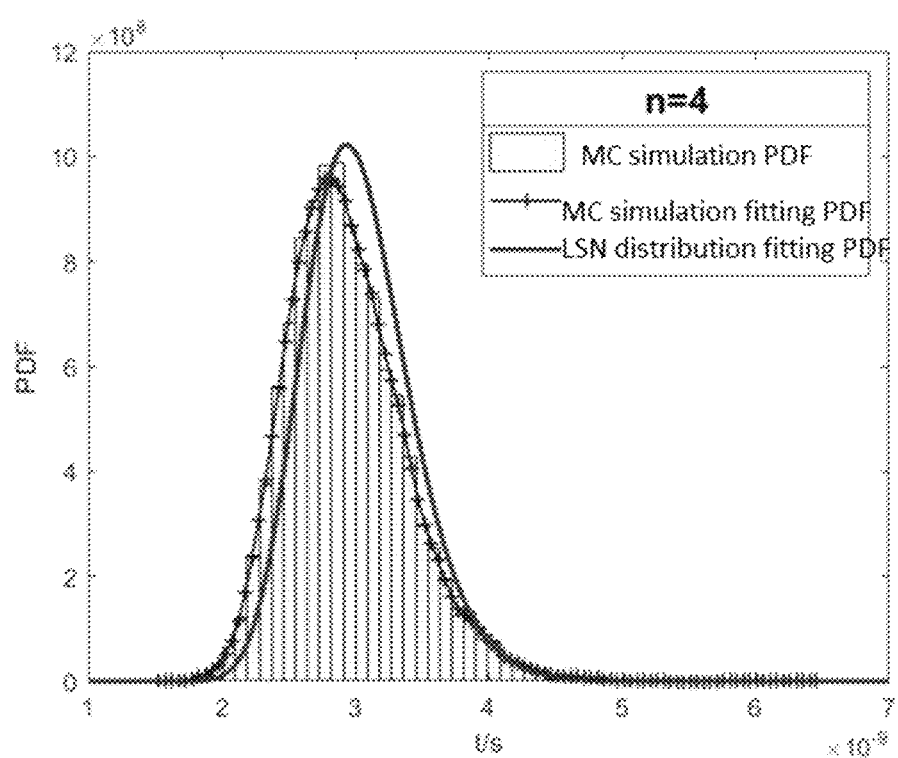
FIG. 3B is a path delay probability density function curve when n=4.
Figure 3C:
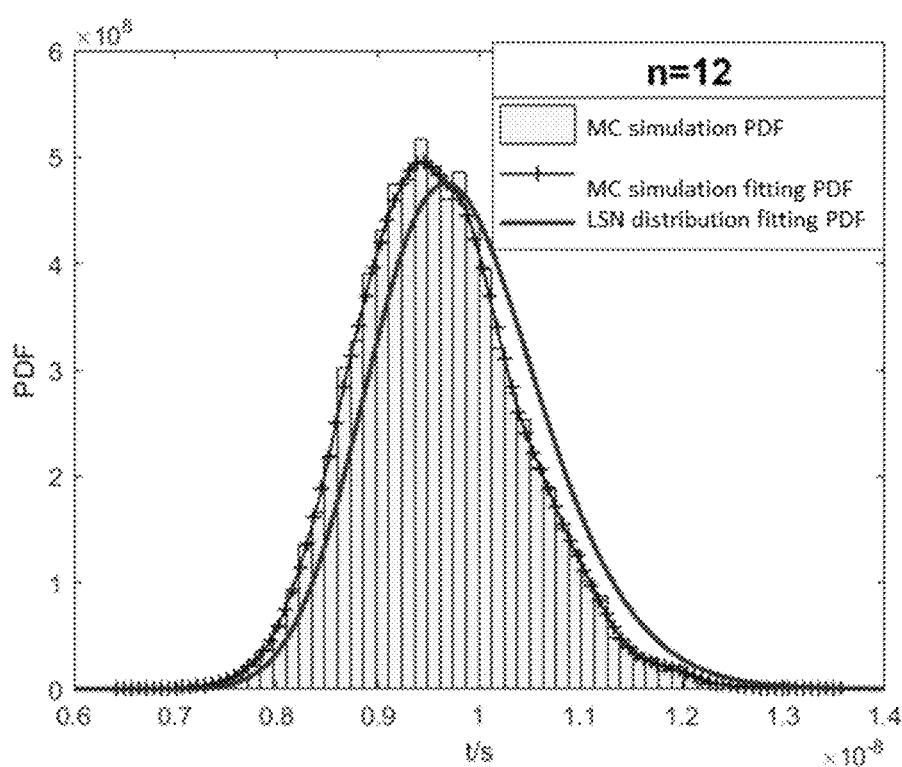
FIG. 3C is a path delay probability density function curve when n=12.
Figure 3D:
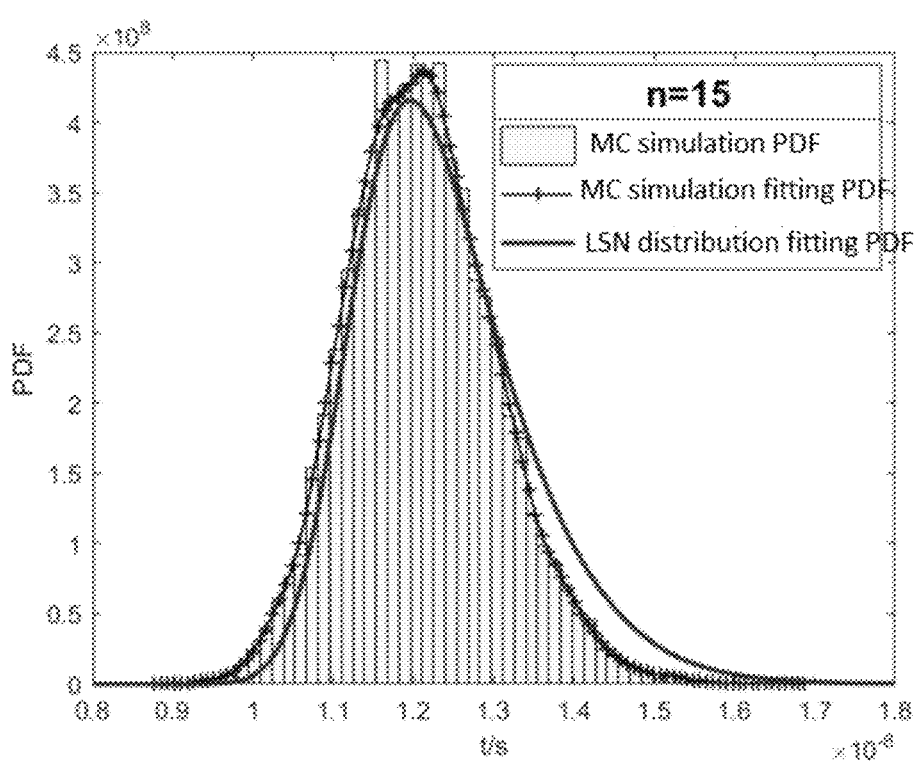
FIG. 3D is a path delay probability density function curve when n=15.

The present specific implementation discloses a statistical timing analysis method of an integrated circuit under an advanced process and a low voltage. The advanced process refers to a process below 40 nm. The low voltage refers to a working voltage of the integrated circuit below a transistor threshold voltage of 0.35 V. A circuit path of the integrated circuit includes at least two stages of circuit cells, for example, the integrated circuit may be a buffer chain. As shown in FIG. 2, two inverters in series are used to form a buffer cell. The method includes the following steps:

S1: A coefficient of each stage of circuit cell is solved according to a linear relationship among a nominal delay of each stage of circuit cell in the circuit path under a non-step input signal, a nominal delay of the current stage of circuit cell under a step input signal, and a nominal delay of the previous stage of circuit cell under the step input signal. Then, a circuit path delay random variable is obtained according to the coefficient of each stage of circuit cell.

S2: Monte Carlo simulation is performed on each stage of circuit cell in the circuit path under the step input signal. Calculation is performed on a statistical sample set obtained through simulation to obtain a mean value, a variance and a skewness of statistical delay. For example, 10000 times of Monte Carlo simulation are performed on the circuit path to obtain a path delay. This step is to achieve an objective that a fitting result can be compared with a simulation result. 10000 times of Monte Carlo simulation are performed on each stage of circuit cell in the circuit path when the input of the cell is a step signal respectively to obtain the delay simulation result of each stage of cell. The 10000 path delay simulation results are sequenced from smallest to biggest. It is considered that the $13^{th}$ delay simulation result is the practical minimum path delay, and the $9987^{th}$ delay simulation result is the practical maximum path delay.

S3: A mean value, a variance and a skewness of statistical path delay under the step input signal are calculated according to the mean value, the variance and the skewness of the statistical delay of each stage of circuit cell in the circuit path under the step input signal obtained in step S2.

Figure 1:
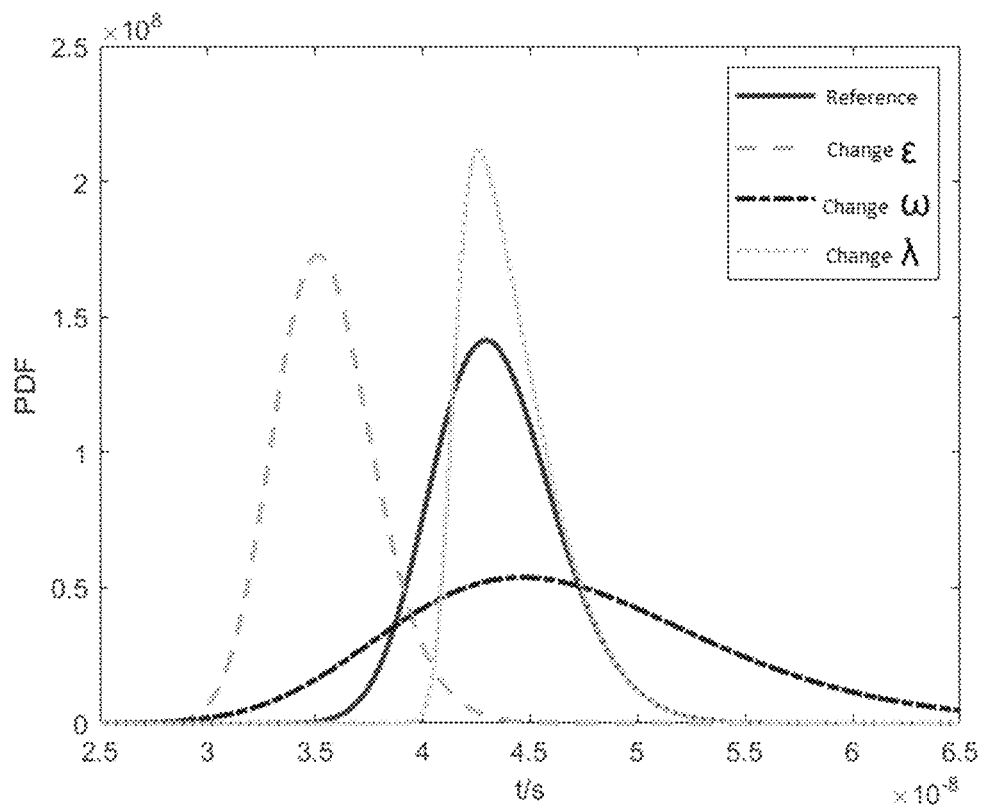
FIG. 1 is a schematic diagram of influence of log skew normal (LSN) distribution parameters on their probability density function in a specific implementation of the present invention.

S4: Circuit path delay distribution parameters are fit according to the mean value, the variance and the skewness of the statistical path delay under the step input signal obtained in step S3. For example, a full line in FIG. 1 is a probability density function (PDF) curve of a certain random variable conforming to log skew normal (LSN) distribution. Three new probability density function curves are obtained by respectively and singly changing a position parameter e, a scaling parameter w and a first shape parameter A of the distribution, so that the influence of the three parameters on the probability density function can be observed.

S5: A probability density function, a maximum value and a minimum value of the statistical path delay under the step input signal are calculated.

Step S1 specifically includes the following substeps:

S11: The coefficient of each stage of circuit cell is solved according to the linear relationship shown in Formula (1):

$$t_{di} = t_{di}^{step} + \eta_{(i-1)} \cdot t_{d(i-1)}^{step} \qquad (1).$$

In Formula (1), $t_{di}$ represents a nominal delay of an $i^{th}$ circuit cell in the circuit path under the non-step input signal, $t_{di}^{step}$ represents a nominal delay of the $i^{th}$ circuit cell in the circuit path under the step input signal, $t_{d(i-1)}^{step}$ represents a nominal delay of an $(i-1)^{th}$ circuit cell in the circuit path under the step input signal, $\eta_{(i-1)}$ represents a coefficient of the $(i-1)^{th}$ circuit cell, $2 \leq i \leq n$, and n represents a total number of the circuit cells in the circuit path.

S12: $\eta_{(i-1)}$ is substituted into Formula (2) to solve the circuit path delay random variable t_path:

$$\text{t\_path} = \sum_{r=1}^{n} t_{dr} = t_{dn}^{step} + \sum_{j=1}^{n-1}(1+\eta_j)t_{dj}^{step}. \qquad (2)$$

In Formula (2), a random variable $t_{dr}$ represents an $r^{th}$ circuit cell delay in the circuit path when the input of the circuit path is a step signal, a random variable $t_{dn}^{step}$ represents an $n^{th}$ circuit cell delay when the input of the cell is a step signal, $\eta_j$ represents a coefficient of a $j^{th}$ circuit cell, and a random variable $t_{dj}^{step}$ represents a $j^{th}$ circuit cell delay when the input of the cell is a step signal.

In step S2, m times of Monte Carlo simulation are respectively performed on each stage of circuit cell in the circuit path when the input of each cell is a step signal, and the statistical sample set obtained through simulation is calculated through Formula (3) to obtain the mean value, the variance and the skewness of the statistical delay of each stage of circuit cell under the step input signal:

$$E(x_r) = \frac{\sum_{k=1}^{m} X_{r,k}}{m}$$

$$D(x_r) = \frac{\sum_{k=1}^{m}(X_{r,k} - \overline{x_r})^2}{m-1} \qquad (3)$$

$$S(x_r) = E\left[\left(\frac{x_r - \overline{x_r}}{\sqrt{D(x_r)}}\right)^3\right] = \frac{E(x_r^3) - 3E(x_r)D(x_r) - [E(x_r)]^3}{[\sqrt{D(x_r)}]^3}$$

In Formula (3), $E(x_r)$ represents a mean value of an $r^{th}$ statistical circuit cell delay under the step input signal, $D(x_r)$ represents a variance of the $r^{th}$ statistical circuit cell delay under the step input signal, $S(x_r)$ represents a skewness of the $r^{th}$ statistical circuit cell delay under the step input signal, $1 \le r \le n$, n represents a total number of the circuit cells in the circuit path, a random variable $x_r$ represents an $r^{th}$ circuit cell delay under the step input, $x_{r,k}$ represents a $k^{th}$ delay sample datum of an $r^{th}$ circuit cell under the step input, $E(x_r^3)$ represents a three-order origin moment of the random variable $x_r$, and $\bar{x}_r = E(x_r)$.

In step S3, the mean value, the variance and the skewness of the statistical path delay when the input of the circuit path is the step signal are obtained through calculation via Formula (4):

$$\begin{cases} E(y) = E\left(\sum_{r=1}^{n} a_r x_r\right) = \sum_{r=1}^{n} a_r E(x_r) \\ D(y) = D\left(\sum_{r=1}^{n} a_r x_r\right) = \sum_{r=1}^{n} a_r^2 D(x_r) \\ S(y) = S\left(\sum_{r=1}^{n} a_r x_r\right) = \dfrac{E\left(\left(\sum_{r=1}^{n} a_r x_r + \mu\right)^3\right)}{\left(D\left(\sum_{r=1}^{n} a_r x_r\right)\right)^{\frac{3}{2}}} \end{cases} \quad (4)$$

In Formula (4), $y = t\_path$ represents a circuit path delay random variable under the step input signal, $E(y)$ represents a mean value of $y$, $D(y)$ represents a variance of $y$, $S(y)$ represents a skewness of $y$, $x_r = t_{dr}^{step}$ represents a random variable of an $r^{th}$ circuit cell delay under the step input signal, $E(x_r)$ represents a mean value of $x_r$, $D(x_r)$ represents a variance of $x_r$, $$E\left(\sum_{r=1}^{n} a_r x_r\right)$$

represents a mean value of $$\sum_{r=1}^{n} a_r x_r, E\left(\left(\sum_{r=1}^{n} a_r x_r + \mu\right)^3\right)$$

represents a mean value of $$\left(\sum_{r=1}^{n} a_r x_r + \mu\right)^3, D\left(\sum_{r=1}^{n} a_r x_r\right)$$

represents a variance of $$\sum_{r=1}^{n} a_r x_r, 1 \le r \le n, a_j = 1 + \eta_j,$$

represents a coefficient of a $j^{th}$ circuit cell, $1 \le j \le n-1$, n represents a total number of the circuit cells in the circuit path, $a_n = 1$, and $\mu = -E(y)$.

In Formula (4), a third skewness expression is further expanded to be written into Formula (5):

$$S(y) = \dfrac{\sum\limits_{\substack{n+1 \\ \sum\limits_{s=1} t_s = 3, t_s \ge 0}} \dfrac{3! \prod\limits_{s=1}^{n} (a_s^{t_s} E((x_s)^{t_s})) \mu^{t_{n+1}}}{\prod\limits_{s=1}^{n+1} (t_s!)}}{(D(y))^{\frac{3}{2}}}. \quad (5)$$

$t_s$ is an integer restrained by an expression $$\sum_{s=1}^{n+1} t_s = 3, t_s \ge 0,$$

and $1 \le s \le n+1$. For $1 \le s \le n-1$, $a_s = 1 + \eta_s$, and $\eta_s$ represents a coefficient of a $s^{th}$ circuit cell. For $s = n$, $a_s = 1$. $x_s$ represents a random variable of a $s^{th}$ circuit cell delay under the step input signal.

Further, distribution parameters in step S4 include the position parameter $\varepsilon$, the scaling parameter $\omega$ and the first shape parameter $\lambda$, and are obtained through calculation via Formula (6):

$$E(y) = \alpha_1 \quad (6)$$

$$D(y) = E(y^2) - (E(y))^2, E(y^2) = \alpha_2$$

$$S(y) = \dfrac{E(y^3) - 3E(y)D(y) - (E(y))^3}{(D(y))^{\frac{3}{2}}}, E(y^3) = \alpha_3.$$

In Formula (6), a random variable $y$ represents a circuit path delay under the step input, $\alpha_p$ represents a p-order origin moment of the random variable $y$, $$1 \le p \le 3, \alpha_p = 2e^{\varepsilon p} e^{\frac{\omega^2 p^2}{2}} \Phi(p\beta\omega),$$

$$\Phi(p\beta\omega) = \dfrac{1}{\sqrt{2\pi}} \int_{-\infty}^{p\beta\omega} e^{-\frac{(p\beta\omega)^2}{2}} d(p\beta\omega),$$

$\beta$ represents a second shape parameter, $$\beta = \dfrac{\lambda}{\sqrt{1+\lambda^2}},$$

$E(y)$ represents the mean value of the statistical path delay under the step input signal, $D(y)$ represents the variance of the statistical path delay under the step input signal, $S(y)$ represents the skewness of the statistical path delay under the step input signal, $E(y^2)$ represents a two-order origin moment of the random variable $y$, and $E(y^3)$ represents a three-order origin moment of the random variable $y$.

In step S5, the probability density function of the statistical path delay is obtained through calculation via Formula (7):

$$f_{LSN}(y) = \dfrac{2}{\omega y} \phi\left(\dfrac{\ln(y) - \varepsilon}{\omega}\right) \Phi\left(\lambda \dfrac{\ln(y) - \varepsilon}{\omega}\right). \quad (7)$$

In Formula (7), $f_{LSN}(y)$ represents the probability density function of the statistical path delay, $$\phi\left(\frac{\ln(y)-\varepsilon}{\omega}\right) = \frac{1}{\sqrt{2\pi}} e^{-\frac{\left(\frac{\ln(y)-\varepsilon}{\omega}\right)^2}{2}},$$

and $\Phi\left(\lambda\frac{\ln(y)-\varepsilon}{\omega}\right) = \frac{1}{\sqrt{2\pi}} \int_{-\infty}^{\lambda\frac{\ln(y)-\varepsilon}{\omega}} e^{-\frac{\left(\lambda\frac{\ln(y)-\varepsilon}{\omega}\right)^2}{2}} d\left(\lambda\frac{\ln(y)-\varepsilon}{a}\right).$ The maximum value and the minimum value of the statistical path delay are obtained through calculation via Formula (8):

$$F_{LSN}(y) = \Phi\left(\frac{\ln(y)-\varepsilon}{\omega}\right) - 2T\left(\frac{\ln(y)-\varepsilon}{\omega}, \lambda\right) = \Phi(\pm 3). \quad (8)$$

In Formula (8), $$\Phi\left(\frac{\ln(y)-\varepsilon}{\omega}\right) = \frac{1}{\sqrt{2\pi}} \int_{-\infty}^{\frac{\ln(y)-\varepsilon}{\omega}} e^{-\frac{\left(\frac{\ln(y)-\varepsilon}{\omega}\right)^2}{2}} d\left(\frac{\ln(y)-\varepsilon}{\omega}\right).$$

$F_{LSN}(y)=\Phi(3)$ is set, and a corresponding solution y is the maximum value of the statistical path delay. $F_{LSN}(y)=\Phi(-3)$ is set, and a corresponding solution y is the minimum value of the statistical path delay. $F_{LSN}(y)$ represents a cumulative distribution function of the statistical path delay, and $$T\left(\frac{\ln(y)-\varepsilon}{\omega}, \lambda\right)$$

is obtained through calculation via Formula (9):

$$T(H, A) = \frac{1}{2\pi} \int_0^A \frac{e^{-\frac{H^2(1+z^2)}{2}}}{1+z^2} dz. \quad (9)$$

In Formula (9), $$H = \frac{\ln(y)-\varepsilon}{\omega},$$

and $A=\lambda$.

FIG. 3 is path delay probability density function curves when n takes different values. n represents the total number of the circuit cells in the circuit path. "MC simulation PDF" represents a probability density histogram of the circuit path delay obtained through Monte Carlo simulation, and is used to be compared with the fitting result. The histogram is drawn by using the "hist" function of MATLAB. "MC simulation fitting PDF" represents the probability density distribution curve obtained through fitting the circuit path delay obtained through Monte Carlo simulation, which is fit by the "ksdensity" function of MATLAB, and is represented by the full line marked with "+" in the figures. "LSN distribution fitting PDF" represents the probability density distribution curve obtained by using the statistical model presented in this invention, and is represented by the full line without a mark in the figures.

What is claimed is:

1. A statistical timing analysis method of an integrated circuit under an advanced process and a low voltage, which is characterized in that the advanced process refers to a process below 40 nm, the low voltage refers to a working voltage of the integrated circuit below a transistor threshold voltage of 0.35 V, a circuit path of the integrated circuit comprises at least two stages of circuit cells, and the method comprises the following steps:

S1: solving a coefficient of each stage of circuit cell according to a linear relationship among a nominal delay of each stage of circuit cell in the circuit path under a non-step input signal, a nominal delay of the current stage of circuit cell under a step input signal, and a nominal delay of the previous stage of circuit cell under the step input signal, and then, obtaining a circuit path delay random variable according to the coefficient of each stage of circuit cell;

S2: performing Monte Carlo simulation on each stage of circuit cell in the circuit path under the step input signal, and performing calculation on a statistical sample set obtained through simulation to obtain a mean value, a variance and a skewness of statistical delay;

S3: calculating a mean value, a variance and a skewness of statistical path delay under the step input signal according to the mean value, the variance and the skewness of the statistical delay of each stage of circuit cell in the circuit path under the step input signal obtained in step S2;

S4: fitting circuit path delay distribution parameters according to the mean value, the variance and the skewness of the statistical path delay under the step input signal obtained in step S3; and S5: calculating a probability density function, a maximum value and a minimum value of the statistical path delay under the step input signal.

2. The statistical timing analysis method of an integrated circuit under an advanced process and a low voltage of claim 1, which is characterized in that step S1 specifically comprises the following substeps:

S11: solving the coefficient of each stage of circuit cell according to the linear relationship shown in Formula (1):

$$t_{di} = t_{di}^{step} + \eta_{((i-1)} \cdot t_{d(i-1)}^{step} \quad (1),$$

wherein in Formula (1), $t_{di}$ represents a nominal delay of an $i^{th}$ circuit cell in the circuit path under the non-step input signal, $t_{di}^{step}$ represents a nominal delay of the $i^{th}$ circuit cell in the circuit path under the step input signal, $t_{d(i-1)}^{step}$ represents a nominal delay of an $(i-1)^{th}$ circuit cell in the circuit path under the step input signal, $\eta_{((i-1)}$ represents a coefficient of the $(i-1)^{th}$ circuit cell, $2 \le i \le n$, and n represents a total number of the circuit cells in the circuit path; and S12: substituting $\eta_{((i-1)}$ into Formula (2) to solve the circuit path delay random variable t_path:

$$t\_path = \sum_{r=1}^{n} t_{dr} = t_{dn}^{step} + \sum_{j=1}^{n-1}(1+\eta_j)t_{dj}^{step}, \quad (2)$$

wherein in Formula (2), a random variable $t_{dr}$ represents an $r^{th}$ circuit cell delay in the circuit path when the input of the circuit path is a step signal, a random variable $t_{dn}^{step}$ represents an $n^{th}$ circuit cell delay when the input of the cell is a step signal, $\eta_j$ represents a coefficient of a $j^{th}$ circuit cell, and a random variable $t_{dj}^{step}$ represents a $j^{th}$ circuit cell delay when the input of the cell is a step signal.

3. The statistical timing analysis method of an integrated circuit under an advanced process and a low voltage of claim 1, which is characterized in that in step S2, m times of Monte Carlo simulation are respectively performed on each stage of circuit cell in the circuit path under the step input signal, and the statistical sample set obtained through simulation is calculated through Formula (3) to obtain the mean value, the variance and the skewness of the statistical delay of each stage of circuit cell under the step input signal:

$$E(x_r) = \frac{\sum_{k=1}^{m} X_{r,k}}{m} \quad (3)$$

$$D(x_r) = \frac{\sum_{k=1}^{m} (X_{r,k} - \overline{x_r})^2}{m-1}$$

$$S(x_r) = E\left[\left(\frac{x_r - \overline{x_r}}{\sqrt{D(x_r)}}\right)^3\right] = \frac{E(x_r^3) - 3E(x_r)D(x_r) - [E(x_r)]^3}{[\sqrt{D(x_r)}]^3},$$

in Formula (3), $E(x_r)$ represents a mean value of an $r^{th}$ statistical circuit cell delay under the step input signal, $D(x_r)$ represents a variance of the $r^{th}$ statistical circuit cell delay under the step input signal, $s(x_r)$ represents a skewness of the $r^{th}$ statistical circuit cell delay under the step input signal, $1 \leq r \leq n$, n represents a total number of the circuit cells in the circuit path, a random variable $x_r$ represents an $r^{th}$ circuit cell delay under the step input, $x_{r,k}$ represents a $k^{th}$ delay sample datum of an $r^{th}$ circuit cell under the step input, $E(x_r^3)$ represents a three-order origin moment of the random variable $x_r$, and $\overline{x_r} = E(x_r)$.

4. The statistical timing analysis method of an integrated circuit under an advanced process and a low voltage of claim 1, which is characterized in that in step S3, the mean value, the variance and the skewness of the statistical path delay under the step input signal are obtained through calculation via Formula (4):

$$\begin{cases} E(y) = E\left(\sum_{r=1}^{n} a_r x_r\right) = \sum_{r=1}^{n} a_r E(x_r) \\ D(y) = D\left(\sum_{r=1}^{n} a_r x_r\right) = \sum_{r=1}^{n} a_r^2 D(x_r) \\ S(y) = S\left(\sum_{r=1}^{n} a_r x_r\right) = \frac{E\left(\left(\sum_{r=1}^{n} a_r x_r + \mu\right)^3\right)}{\left(D\left(\sum_{r=1}^{n} a_r x_r\right)\right)^{\frac{3}{2}}} \end{cases} \quad (4)$$

in Formula (4), y=t_path represents a circuit path delay random variable under the step input signal, E(y) represents a mean value of y, D(y) represents a variance of y, S(y) represents a skewness of y, $x_r = t_{dr}^{step}$ represents a random variable of an $r^{th}$ circuit cell delay under the step input signal, $E(x_r)$ represents a mean value of $x_r$, $D(x_r)$ represents a variance of $x_r$, $$E\left(\sum_{r=1}^{n} a_r x_r\right)$$

represents a mean value of $$\sum_{r=1}^{n} a_r x_r, \ E\left(\left(\sum_{r=1}^{n} a_r x_r + \mu\right)^3\right)$$

represents a mean value of $$\left(\sum_{r=1}^{n} a_r x_r + \mu\right)^3,$$

$$D\left(\sum_{r=1}^{n} a_r x_r\right)$$

represents a variance of $$\sum_{r=1}^{n} a_r x_r, \ 1 \leq r \leq n, \ a_j = 1 + \eta_j,$$

$\eta_j$ represents a coefficient of a $j^{th}$ circuit cell, $1 \leq j \leq n-1$, n represents a total number of the circuit cells in the circuit path, $a_n=1$, and $\mu=-E(y)$; and in Formula (4), a third skewness expression is further expanded to be written into Formula (5):

$$s(y) = \frac{\sum_{\substack{n+1 \\ \sum_{s=1} t_s = 3, t_s > 0}} \frac{3!}{\prod_{s=1}^{n+1}(t_s!)} \prod_{q=1}^{n} \left(a_q^{t_q} E((x_q)^{t_q})\right) \mu^{t_{n+1}}}{(D(y))^{\frac{3}{2}}}, \quad (5)$$

wherein $t_s$ is restrained by an expression $$\sum_{s=1}^{n+1} t_s = 3, \ t_s \geq 0,$$

and $1 \leq s \leq n+1$; for $1 \leq q \leq n-1$, $a_q=1+\eta_q$, and $\eta_q$ represents a coefficient of a $q^{th}$ circuit cell; for q=n, $a_q=1$; and $x_q$ represents a random variable of a $q^{th}$ circuit cell delay under the step input signal.

5. The statistical timing analysis method of an integrated circuit under an advanced process and a low voltage of claim 1, which is characterized in that distribution parameters in step S4 comprise a position parameter $\varepsilon$, a scaling parameter $\omega$ and a first shape parameter $\lambda$, and are obtained through calculation via Formula (6):

$$E(y) = \alpha_1 \quad (6)$$

$$D(y) = E(y^2) - (E(y))^2, \ E(y^2) = \alpha_2$$

$$S(y) = \frac{E(y^3) - 3E(y)D(y) - (E(y))^3}{(D(y))^{\frac{3}{2}}}, \ E(y^3) = \alpha_3,$$

in Formula (6), a random variable y represents a circuit path delay under the step input, $\alpha_p$ represents a p-order origin moment of the random variable y, $$1 \le p \le 3, \alpha_p = 2e^{\varepsilon p}e^{\frac{\omega^2 p^2}{2}}\Phi(p\beta\omega),$$

$$\Phi(p\beta\omega) = \frac{1}{\sqrt{2\pi}} \int_{-\infty}^{p\beta\omega} e^{-\frac{(p\beta\omega)^2}{2}} d(p\beta\omega),$$

β represents a second shape parameter, $$\beta = \frac{\lambda}{\sqrt{1+\lambda^2}},$$

E(y) represents the mean value of the statistical path delay under the step input signal, D(y) represents the variance of the statistical path delay under the step input signal, S(y) represents the skewness of the statistical path delay under the step input signal, $E(y^2)$ represents a two-order origin moment of the random variable y, and $E(y^3)$ represents a three-order origin moment of the random variable y.

6. The statistical timing analysis method of an integrated circuit under an advanced process and a low voltage of claim 5, which is characterized in that in step S5, the probability density function of the statistical path delay is obtained through calculation via Formula (7):

$$f_{LSN}(y) = \frac{2}{\omega y}\phi\left(\frac{\ln(y)-\varepsilon}{\omega}\right)\Phi\left(\lambda\frac{\ln(y)-\varepsilon}{\omega}\right), \quad (7)$$

in Formula (7), $f_{LSN}(y)$ represents the probability density function of the statistical path delay, $$\phi\left(\frac{\ln(y)-\varepsilon}{\omega}\right) = \frac{1}{\sqrt{2\pi}}e^{-\frac{(\frac{\ln(y)-\varepsilon}{\omega})^2}{2}},$$

and $\Phi(\lambda\frac{\ln(y)-E}{\omega}) = \frac{1}{\sqrt{2\pi}}\int_{-\infty}^{\lambda\frac{\ln(y)-\varepsilon}{\omega}} e^{-\frac{(\lambda\frac{\ln(y)-\varepsilon}{\omega})^2}{2}} d\left(\lambda\frac{\ln(y)-\varepsilon}{\omega}\right);$ the maximum value and the minimum value of the statistical path delay are obtained through calculation via Formula (8):

$$F_{LSN}(y) = \Phi\left(\frac{\ln(y)-\varepsilon}{\omega}\right) - 2T\left(\frac{\ln(y)-\varepsilon}{\omega}, \lambda\right) = \Phi(\pm 3), \quad (8)$$

in Formula (8), (( $$\Phi\left(\frac{\ln(y)-\varepsilon}{\omega}\right) = \frac{1}{\sqrt{2\pi}}\int_{-\infty}^{\frac{\ln(y)-\varepsilon}{\omega}} e^{-\frac{(\frac{\ln(y)-\varepsilon}{\omega})^2}{2}} d\left(\frac{\ln(y)-\varepsilon}{\omega}\right);$$

$F_{LSN}(y)=\Phi(3)$ is set, and a corresponding solution y is the maximum value of the statistical path delay; $F_{LSN}(y)=\Phi(-3)$ is set, and a corresponding solution y is the minimum value of the statistical path delay; and $F_{LSN}(y)$ represents a cumulative distribution function of the statistical path delay, and $$T\left(\frac{\ln(y)-\varepsilon}{\omega}, \lambda\right)$$

is obtained through calculation via Formula (9):

$$T(H, A) = \frac{1}{2\pi}\int_0^A \frac{e^{\frac{-H^2(1+z^2)}{2}}}{1+z^2} dz, \quad (9)$$

in Formula (9), $$H = \frac{\ln(y)-\varepsilon}{\omega},$$

and A=λ.

* * * * *